United States Patent [19]

Kikuchi

[11] Patent Number: 5,598,663
[45] Date of Patent: Feb. 4, 1997

[54] HYDROPONIC NUTRIENT SOLUTION CONTROL SYSTEM

[75] Inventor: Hiroshi Kikuchi, Tokyo-to, Japan

[73] Assignee: Kabushiki Kaisha Toshiba, Kawasaki, Japan

[21] Appl. No.: 301,039

[22] Filed: Sep. 6, 1994

Related U.S. Application Data

[63] Continuation of Ser. No. 145,305, Nov. 3, 1993, abandoned, which is a continuation of Ser. No. 622,968, Dec. 6, 1990, abandoned.

[30] Foreign Application Priority Data

Dec. 12, 1989 [JP] Japan .................... 1-320637

[51] Int. Cl.$^6$ ............................................. A01G 31/00
[52] U.S. Cl. ................................................................ 47/62
[58] Field of Search ........................ 47/62 N, 1.01; 137/1, 5

[56] References Cited

U.S. PATENT DOCUMENTS

| | | | |
|---|---|---|---|
| 4,149,970 | 4/1979 | Atkins | 47/62 |
| 4,152,215 | 5/1979 | Yoshino | 47/62 N |
| 4,294,037 | 10/1981 | Mosse | 47/62 N |
| 4,320,594 | 3/1982 | Raymond | 47/62 N |
| 4,926,585 | 5/1990 | Dreschel | 47/62 N |
| 4,992,942 | 2/1991 | Bauerle | 47/62 N |
| 5,184,420 | 2/1993 | Papadopoulos | 47/62 N |

FOREIGN PATENT DOCUMENTS

| | | | |
|---|---|---|---|
| 0110111 | 6/1984 | European Pat. Off. | 47/62 N |
| 7712467 | 5/1978 | Netherlands | 47/62 N |
| 2192875 | 1/1988 | United Kingdom | 47/62 N |

OTHER PUBLICATIONS

Oakton WD–00661–10 "Dissolved Solid Tester" Considered by the examiner to be an ion analyzer means as claimed by the applicant, Devices of this sort have been in use in the hydroponics industry for many years.

The ABC of NFT by Dr. Allen Coope pp. 47–89.

*Primary Examiner*—Henry E. Raduazo
*Attorney, Agent, or Firm*—Foley & Lardner

[57] ABSTRACT

A hydroponic nutrient solution control system capable of performing the nutrient solution control automatically, accurately, effectively, and efficiently. In the system, the supplies of the acid nutrient ion ingredient solutions and the alkali nutrient ion ingredient solutions from the acid solution tanks and the alkali solution tanks to the nutrient solution tank are controlled according to the pH measured by the pH meter and the ion concentrations measured by the ion analyzer. The system may also controls the supplies of the high concentration nutrient solutions and the water from the high concentration nutrient solution tanks and the water supply according to the electrolytic conductivity measured by the electrolytic conductivity meter.

9 Claims, 3 Drawing Sheets

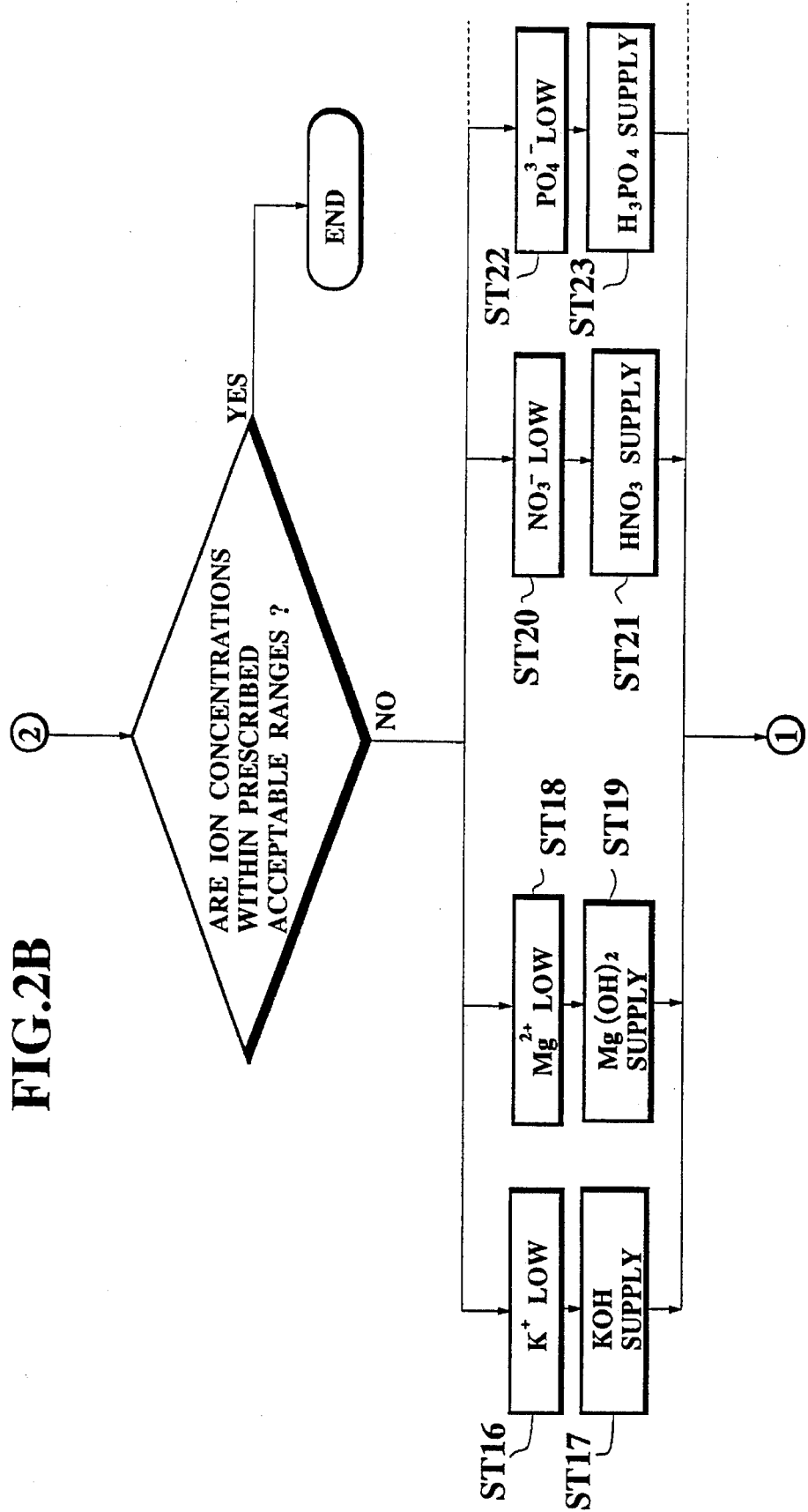

HYDROPONIC NUTRIENT SOLUTION CONTROL SYSTEM

This application is a continuation, of application Ser. No. 08/145,305, filed Nov. 3, 1993 now abandoned, which in turn is a continuation of application Ser. No. 07/622,968, filed Dec. 6, 1990 and now abandoned.

BACKGROUND OF THE INVENTION

1. Field of the Invention

The present invention relates to a hydroponic nutrient solution control system for growing plants hydroponically by controlling supplies of nutrient solutions (solutions of inorganic fertilizers in water) to the plants.

2. Description of the Background Art

In the hydroponics, the plants are grown under the control of a hydroponic nutrient solution control system which controls supplies of nutrient solutions to the plants.

In a conventional hydroponic nutrient solution control system, this controlling is performed according to the pH and/or the electrolytic conductivity of the nutrient solutions.

For instance, when the electrolytic conductivity of the nutrient solution decreased, high concentration nutrient solutions are supplied to the nutrient solution in order to raise the electrolytic conductivity to prescribed target range, whereas when the electrolytic conductivity of the nutrient solution increased, water is added to the nutrient solution in order to lower the electrolytic conductivity to prescribed target range.

Similarly, in a case of using the pH, an acid solution and an alkali solution are used to control the pH of the nutrient solution within a prescribed target range.

However, in such a conventional hydroponic nutrient solution control system, it has been difficult to accurately supply the nutrient solutions containing the ingredients necessary for the plants to be grown. This is due to the fact that in a course of the growth of the plants, the organic acids are leaked from the roots of the plants, such that even when the ingredients unnecessary for the plants are being compiled, this fact is not reflected by the pH or the electrolytic conductivity of the nutrient solutions. As a consequence, the necessary adjustments of the nutrient solutions cannot be provided, so that the growth of the plants are retarded if not hampered fatally.

Also, because the information on the pH and the electrolytic conductivity cannot reflect the actual state of the nutrient solutions accurately, even when the abnormality was found in the growing plants, the cause of the abnormality cannot be ascertained from the information on the pH and the electrolytic conductivity, so that the entire nutrient solutions have to be replaced in such a case, which increases the waste of the nutrient solutions.

Also, in a conventional hydroponic nutrient solution control system, the controlling of the pH is performed by using one acid solution and one alkali solution only. However, necessary amounts of the acid solution or the alkali solution vary from time to time, so that it is desirable to have more than one acid solutions and more than one alkali solutions, in order to be able to cope with various different situations.

It is known that a plant in a process of growing may consume particular ingredients more than other ingredients, depending on the external conditions such as an amount of sunshine, a temperature of the air, and a temperature of the nutrient solution. In such a case, the nutrient solution control according to the pH or the electrolytic conductivity tends to cause a lack of particular nutrient solution ion ingredients. In this state, the plant is unable to absorb the necessary ion ingredients because of their low concentration in the nutrient solution.

On the other hand, the ion ingredients in the nutrient solution cannot be controlled easily, because the ions exist in forms of bases such as $KNO_3$.

Furthermore, when the concentration of a particular kind of ions is very low, the balance of ions achieved in the original nutrient solution is often lost, such that the pH of the nutrient solution often differs greatly from the original value.

SUMMARY OF THE INVENTION

It is therefore an object of the present invention to provide a hydroponic nutrient solution control system capable of performing the nutrient solution control automatically, accurately, effectively, and efficiently.

According to one aspect of the present invention there is provided a hydroponic nutrient solution control system for controlling nutrient solution to be supplied to plants to be grown, comprising: nutrient solution tank means for containing the nutrient solution to be supplied to the plants, to which the nutrient solution supplied to the plants are returned; pH meter means for measuring pH of the nutrient solution in the nutrient solution tank means; ion analyzer means for measuring ion concentrations of nutrient ion ingredients of the nutrient solution in the nutrient solution tank means; acid solution tank means for containing acid nutrient ion ingredient solutions to be supplied to the nutrient solution in the nutrient solution tank means; alkali solution tank means for containing alkali nutrient ion ingredient solutions to be supplied to the nutrient solution in the nutrient solution tank means; and means for controlling supplies of the acid nutrient ion ingredient solutions and the alkali nutrient ion ingredient solutions from the acid solution tank means and the alkali solution tank means, according to the pH measured by the pH meter means and the ion concentrations measured by the ion analyzer means.

According to another aspect of the present invention there is provided a method of hydroponic nutrient solution control for controlling nutrient solution to be supplied to plants to be grown, comprising the steps of: providing nutrient solution tank means for containing the nutrient solution to be supplied to the plants, to which the nutrient solution supplied to the plants are returned; measuring pH of the nutrient solution in the nutrient solution tank means by pH meter means; measuring ion concentrations of nutrient ion ingredients of the nutrient solution in the nutrient solution tank means by ion analyzer means; providing acid solution tank means for containing acid nutrient ion ingredient solutions to be supplied to the nutrient solution in the nutrient solution tank means; providing alkali solution tank means for containing alkali nutrient ion ingredient solutions to be supplied to the nutrient solution in the nutrient solution tank means; and controlling supplies of the acid nutrient ion ingredient solutions and the alkali nutrient ion ingredient solutions from the acid solution tank means and the alkali solution tank means, according to the pH measured by the pH meter means and the ion concentrations measured by the ion analyzer means.

Other features and advantages of the present invention will become apparent from the following description taken in conjunction with the accompanying drawings.

DETAILED DESCRIPTION OF THE PREFERRED EMBODIMENTS

Figure 1:
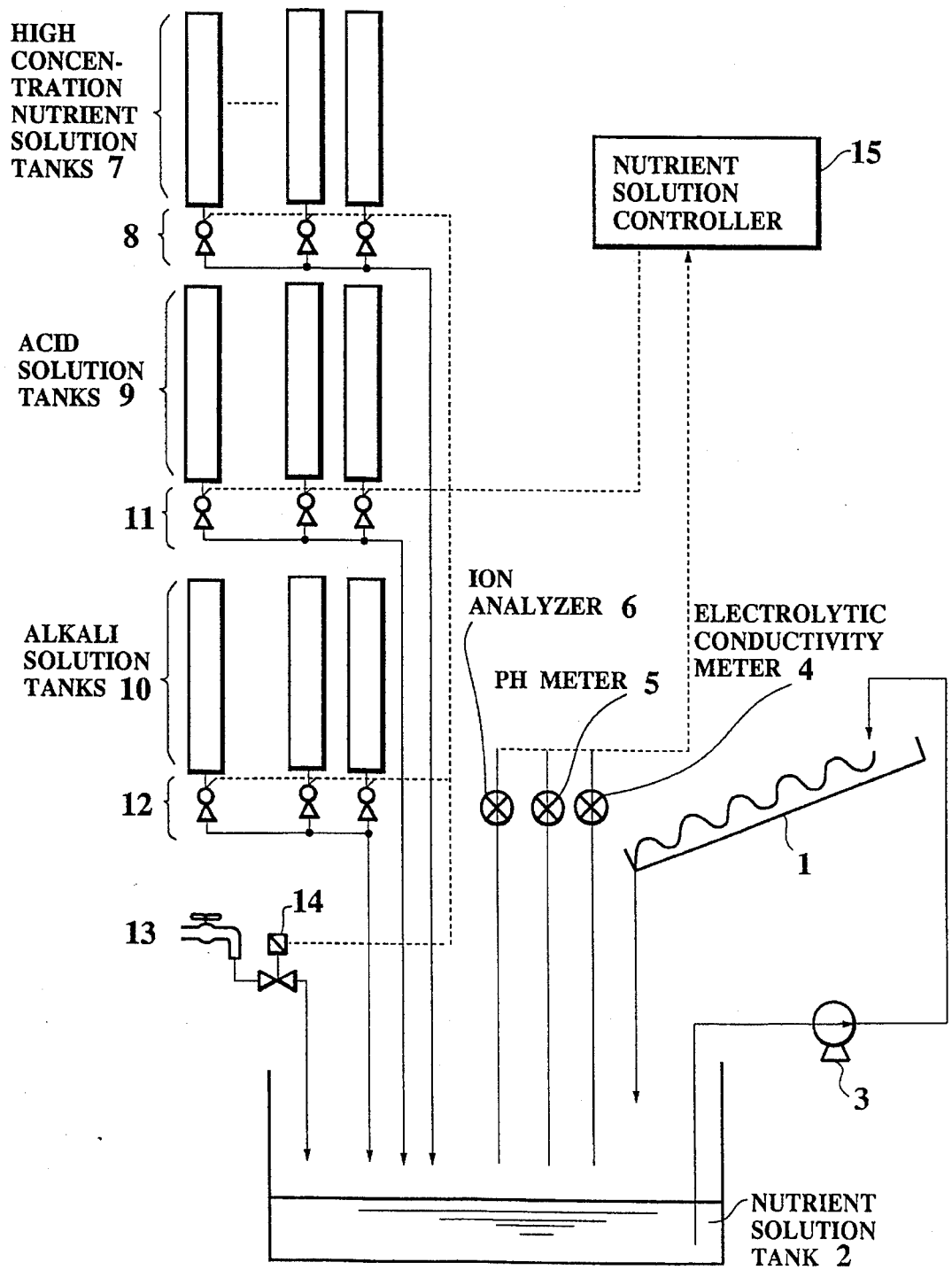
FIG. 1 is a block diagram of one embodiment of a hydroponic nutrient solution control system according to the present invention.

Referring now to FIG. 1, one embodiment of a hydroponic nutrient solution control system according to the present invention will be described in detail.

This system is adapted to a so called NFT (nutrient flow technique) culture method, and comprises a culture panel 1 on which plants to be grown are planted, a nutrient solution tank 2 for containing the nutrient solution to be supplied to the plants, and a supply pump 3 for supplying the nutrient solution in the nutrient solution tank 2 to an upper stream side of the culture panel 1 from which the nutrient solution flows down through a lower stream side of the culture panel 1 back to the nutrient solution tank 2 while supplying the nutrient ingredients to the plants.

The system further comprises an electrolytic conductivity meter 4 for measuring an electrolytic conductivity of the nutrient solution in the nutrient solution tank 2 which is proportional to a concentration of the nutrient solution and therefore is indicative of the total ion concentration of the nutrient solution as a whole, a pH meter 5 for measuring a balance of acid and alkali, i.e., pH of the nutrient solution in the nutrient solution tank 2, and an ion analyzer 6 for analyzing ion contents and measuring ion concentrations of the nutrient solution in the nutrient solution tank 2. The multi-ion meter LQ201 of Toshiba which uses the ion electrode method is suitable for the ion analyzer 6 of this system.

The system further comprises a plurality of high concentration nutrient solution tanks 7 for containing several high concentration nutrient solutions to be supplied to the nutrient solution tank 2, a plurality of high concentration nutrient solution tank pumps 8 capable of controlling amounts of the high concentration nutrient solutions flowing out from the high concentration nutrient solution tanks 7, a plurality of acid solution tanks 9 and a plurality of alkali solution tanks 10 for containing several acid ingredient solutions and several alkali ingredient solutions, respectively, to be supplied to the nutrient solution tank 2, a plurality of acid solution tank pumps 11 and a plurality of alkali solution tank pumps 12 capable of controlling amounts of the acid ingredient solutions and the alkali ingredient solutions flowing out from the acid solution tank 9 and the alkali solution tank 10, respectively, a water supply 13 for supplying water to dilute the nutrient solution in the nutrient solution tank 2, a water supply electromagnetic valve 13 capable of controlling an amount of water flowing out from the water supply 13, and a nutrient solution controller 15 for controlling the high concentration nutrient solution tank pumps 8, acid solution tank pumps 11, alkali solution tank pumps 12, and a water supply electromagnetic valve 14, according to the electrolytic conductivity, pH, and ion concentrations of ion contents obtained by the electrolytic conductivity meter 4, pH meter 5, and ion analyzer 6.

The high concentration nutrient solution tanks 7 separately contain various high concentration nutrient solutions which includes various nutrient ingredient ions at high concentrations.

The acid solution tanks 9 separately contain various acid nutrient ion ingredient solutions including those of the major nutrient ion ingredients such as $HNO_3$, $H_3PO_4$, and $H_2SO_4$, as well as those of minor nutrient ion ingredients such as $H_3BO_4$ and $H_2MoO_4$.

The alkali solution tanks 10 separately contain various alkali nutrient ion ingredient solutions including those of the major nutrient ion ingredients such as $KOH$, $Ca(OH)_2$, $Mg(OH)_2$ and $NH_4OH$, as well as those of minor nutrient ion ingredients such as $Fe(OH)_2$, $Fe(OH)_3$, $Mn(OH)_2$, $Zn(OH)_2$, and $Cu(OH)_2$.

Figure 2A:
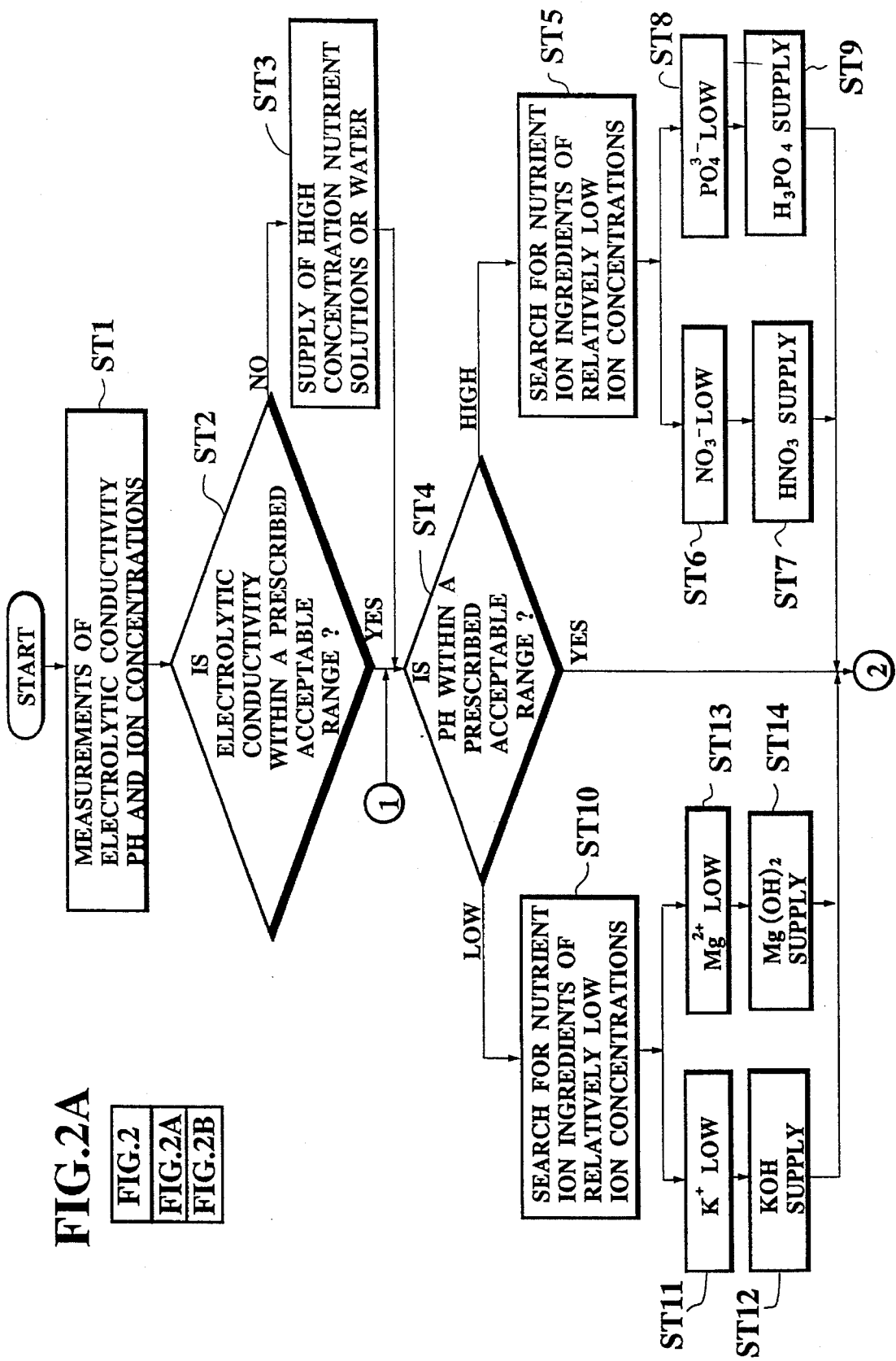
FIG. 2 which has been divided into two parts (FIG. 2A and FIG. 2B) is a flow chart for the nutrient solution control operation performed by the system of FIG. 1.

This system operates under the control of the nutrient solution controller 15 according to the flow chart of FIG. 2, as follows.

Initially, in preparing new nutrient solution, the high concentration nutrient solution tank pumps 8 and the water supply electromagnetic valve 14 are controlled according to the growth level of the plants to be grown, so as to fill the nutrient solution tank 2 with the appropriate nutrient solution containing all the nutrient ion ingredients necessary for the plants mixed evenly.

As the supply pump 3 supplies this nutrient solution in the nutrient solution tank 2 to the upper stream side of the culture panel 1 from which the nutrient solution flows down through the lower stream side of the culture panel 1 back to the nutrient solution tank 2 while supplying the nutrient ion ingredients to the plants, those nutrient ion ingredients which are easier to be absorbed decrease, and the pH of the nutrient solution changes.

In order to control such a situation, first at the step ST1, the nutrient solution controller 15 collects the electrolytic conductivity, pH, and ion concentrations of ion contents of the nutrient solution in the nutrient solution tank 2 measured by the electrolytic conductivity meter 4, pH meter 5, and ion analyzer 6 through regular constant interval samplings.

Next, at the step ST2, whether the measured electrolytic conductivity is within a prescribed acceptable range or not is determined. When the measured electrolytic conductivity is found to be within the prescribed acceptable range, the step ST4 will be taken next. Otherwise, next at the step ST3, when the measured electrolytic conductivity is found to be too low, the high concentration nutrient solution tank pumps 8 are controlled such that appropriate amounts of the high concentration nutrient solutions to raise the electrolytic conductivity of the nutrient solution up to the prescribed acceptable range are supplied to the nutrient solution tank 2, whereas when the measured electrolytic conductivity is found to be too high, the water supply electromagnetic valve 14 is controlled such that appropriate amount of the water to lower the electrolytic conductivity of the nutrient solution up to the prescribed acceptable range is supplied to the nutrient solution tank 2.

Then at the step ST4, whether the measured pH is within a prescribed acceptable range or not is determined. When the measured pH is found to be within the prescribed acceptable range, the step ST15 will be taken next.

Otherwise, when the measured pH is found to be too high, i.e., when the nutrient solution is excessively alkalic, those nutrient ion ingredients whose ion concentrations are found to be relatively low are supplied from the acid solution tanks 9 in forms of acid ingredient solutions by controlling the acid solution tank pumps 11, so as to bring the pH of the nutrient solution to the prescribed acceptable range. Namely, in this case, next at the step ST5, the ion concentrations of the ion contents of the nutrient solution are checked to find those nutrient ion ingredients whose ion concentrations are found to be relatively low. Then, when the ion concentration for $NO_3-$ is found to be relatively low (a case of step ST6) for example, an appropriate amount of the $HNO_3$ solution is supplied at the step ST7, whereas when the ion concentration for $PO_4^{3-}$ is found to be relatively low (a case of step ST8) for example, an appropriate amount of the $H_3PO_4$ solution is supplied at the step ST9.

On the other hand, when the measured pH is found to be too low, i.e., when the nutrient solution is excessively acidic, those nutrient ion ingredients whose ion concentrations are found to be relatively low are supplied from the alkali solution tanks 10 in forms of alkali ingredient solutions by controlling the alkali solution tank pumps 12, so as to bring the pH of the nutrient solution to the prescribed acceptable range. Namely, in this case, next at the step ST10, the ion concentrations of the ion contents of the nutrient solution are checked to find those nutrient ion ingredients whose ion concentrations are found to be relatively low. Then, when the ion concentration for $K^+$ is found to be relatively low (a case of step ST11) for example, an appropriate amount of the KOH solution is supplied at the step ST12, whereas when the ion concentration for $Mg^{2+}$ is found to be relatively low (a case of step ST13) for example, an appropriate amount of the $Mg(OH)_2$ solution is supplied at the step ST14.

Then, at the step ST15, the ion concentrations of the ion contents of the nutrient solution are checked to find those nutrient ion ingredients whose ion concentrations are found to be lower than prescribed acceptable ranges. This step is taken because the ion concentrations for all the nutrient ion ingredients of the nutrient solution may not necessarily be within the prescribed acceptable ranges, even when the pH of the nutrient solution is within the prescribed acceptable range. Thus, when the ion concentrations for all the nutrient ion ingredients of the nutrient solution are found to be within prescribed acceptable ranges, the controlling process by the nutrient solution controller 15 is terminated until the next samplings of the electrolytic conductivity, pH and ion concentrations.

Otherwise, when the ion concentration for positive ions such as $K^+$ or $Mg^{2+}$ is found to be lower than the prescribed acceptable range (a case of step ST16 or ST18) for example, an appropriate amount of the KOH solution or $Mg(OH)_2$ solution is supplied at the step ST17 or ST19, respectively, whereas when the ion concentration for negative ions such as $NO_3^-$ or $PO_4^{3-}$ is found to be lower than the prescribed acceptable range (a case of step ST20 or ST22) for example, an appropriate amount of the $HNO_3$ solution or $H_3PO_4$ solution is supplied at the step ST21 or ST23, respectively, so as to bring ion concentrations for all the nutrient ion ingredients of the nutrient solution to the prescribed acceptable ranges.

In a case the ion concentrations for certain nutrient ion ingredients are found to be higher than the prescribed acceptable ranges at the step ST15, the supply from the acid solution tanks 9 or the alkali solution tanks 10 which contain solutions of such nutrient ion ingredients are stopped while the supply from all the other acid solution tanks 9 and the alkali solution tanks 10 are continued so as to achieve the overall balance for the ion concentrations for all the nutrient ion ingredients of the nutrient solution, and then the entire nutrient solution is diluted by the water from the water supply 13 in order to restore the original overall ion concentration of the nutrient solution as a whole.

Then, the process returns to the step ST4 described above, so as to check the pH of the nutrient solution once again, because the pit may be changed as a result of the ion concentration control at the steps ST16 to ST23.

Thus, according to this system, not only the electrolytic conductivity and pH, but also the ion concentrations for the nutrient ion ingredients of the nutrient solution are controlled, so that the nutrient solution control can be performed more accurately and effectively.

Also, according to this system, the pH of the nutrient solution is controlled according to the ion concentrations for the nutrient ion ingredients of the nutrient solution, so that the overuse and waste of the acid or alkali solutions for the purpose of pH controlling can be prevented, and therefore the nutrient solution control can be performed more efficiently and stably.

Furthermore, the entire nutrient solution control can be performed under the controlling by the nutrient solution controller 15 which can be adapted to different types of plants to be grown, different conditions in which the plants are to be grown, or different growth levels of the plants to be grown, by the appropriate programming according to the most suitable nutrient solution for a given situation, so that the entire nutrient solution control can be performed automatically.

It is to be noted that, although the above embodiment has been described for the system adapted to the NFT culture method, it should be obvious that the present invention is equally applicable to the system for the other culture method such as a rock wool culture method and a DFT (deep flow technique) culture method.

Besides this, many modifications and variations of the above embodiments may be made without departing from the novel and advantageous features of the present invention. Accordingly, all such modifications and variations are intended to be included within the scope of the appended claims.

What is claimed is:

1. A hydroponic nutrient solution control system for controlling nutrient solution to be supplied to plants to be grown, comprising:

nutrient solution tank means for containing the nutrient solution to be supplied to the plants, to which the nutrient solution supplied to the plants are returned;

pH meter means for measuring pH of the nutrient solution in the nutrient solution tank means;

an ion analyzer device for measuring an ion concentration of a plurality of nutrient ion ingredients of the nutrient solution in the nutrient solution tank means independent of other nutrient ion ingredients of the nutrient solution in the nutrient solution tank means;

a plurality of acid solution tank means for containing acid nutrient ion ingredient solutions, each acid solution tank means separately containing an acid nutrient ion ingredient solution comprising a compound selected from the group consisting of $HNO_3$, $H_3PO_4$, and $H_2SO_4$, to be supplied to the nutrient solution in the nutrient solution tank means;

a plurality of alkali solution tank means for containing alkali nutrient ion ingredient solutions, each alkali solution tank means separately containing an alkali nutrient ion ingredient solution comprising a compound selected from the group consisting of KOH, $Ca(OH)_2$, $Mg(OH)_2$, and $NH_4OH$, to be supplied to the nutrient solution in the nutrient solution tank means; and means for automatically controlling supplies of the acid nutrient ion ingredient solutions and the alkali nutrient ion ingredient solutions by selectively operating appropriate ones of the acid solution tank means and alkali solution tank means, according to the pH measured by the pH meter means and the ion concentrations measured by the ion analyzer device.

2. The system of claim 1, wherein the controlling means controls the supplies of the acid nutrient ion ingredient solutions and the alkali nutrient ion ingredient solutions from the acid solution tank means and the alkali solution tank means, such that when the pH measured by the pH meter means is lower than a prescribed acceptable range, those alkali nutrient ion ingredient solutions whose ion concentrations are measured to be relatively low by the ion analyzer means are supplied from the alkali solution tank means, whereas when the pH measured by the pH meter means is higher than a prescribed acceptable range, those acid nutrient ion ingredient solutions whose ion concentrations are measured to be relatively low by the ion analyzer means are supplied from the acid solution tank means.

3. The system of claim 2, wherein the controlling means also controls the supplies of the acid nutrient ion ingredient solutions and the alkali nutrient ion ingredient solutions from the acid solution tank means and the alkali solution tank means, when at least one of the ion concentrations measured by the ion analyzer means is outside a prescribed acceptable range, in order to bring said at least one of the ion concentrations to the prescribed acceptable range.

4. The system of claim 3, wherein the controlling means controls the supplies of the acid nutrient ion ingredient solutions and the alkali nutrient ion ingredient solutions from the acid solution tank means and the alkali solution tank means, such that when at least one of the ion concentrations for positive ions measured by the ion analyzer means is lower than the prescribed acceptable range, those alkali nutrient ion ingredient solutions which contain said positive ions are supplied from the alkali solution tank means, whereas when at least one of the ion concentrations for negative ions measured by the ion analyzer means is lower than the prescribed acceptable range, those acid nutrient ion ingredient solutions which contain said negative ions are supplied from the acid solution tank means.

5. The system of claim 3, wherein the controlling means controls the pH of the nutrient solution in the nutrient solution tank means again after the supplies of the acid nutrient ion ingredient solutions and the alkali nutrient ion ingredient solutions from the acid solution tank means and the alkali solution tank means are controlled in order to bring said at least one of the ion concentrations to the prescribed acceptable range.

6. The system of claim 1, further comprising:
electrolytic conductivity meter means for measuring electrolytic conductivity of the nutrient solution in the nutrient solution tank means;
high concentration nutrient solution tank means for containing high concentration nutrient solutions to be supplied to the nutrient solution in the nutrient solution tank means; and
water supply means for supplying water to be supplied to the nutrient solution in the nutrient solution tank means;
and wherein the controlling means also controls the supplies of the high concentration nutrient solutions and the water from the high concentration nutrient solution tank means and the water supply means according to the electrolytic conductivity measured by the electrolytic conductivity meter means.

7. The system of claim 6, wherein the controlling means also controls the supplies of the acid nutrient ion ingredient solutions, the alkali nutrient ion ingredient solutions, and the water from the acid solution tank means, the alkali solution tank means, and the water supply means, such that when the ion concentrations for at least one nutrient ion ingredient measured by the ion analyzer means is higher than the prescribed acceptable range, those alkali nutrient ion ingredient solutions and those acid nutrient ion ingredient solutions which do not contain said at least one nutrient ion ingredient are supplied from the alkali solution tank means and the acid solution tank means until the ion concentrations for all the nutrient ion ingredients are balanced, and then the water is supplied from the water supply means until the electrolytic conductivity of the nutrient solution in the nutrient solution tank means is restored to that before the supplies of the acid nutrient ion ingredient solutions and the alkali nutrient ion ingredient solutions from the acid solution tank means and the alkali solution tank means.

8. The system of claim 7, wherein the controlling means controls the pH of the nutrient solution in the nutrient solution tank means again after the supplies of the acid nutrient ion ingredient solutions, the alkali nutrient ion ingredient solutions, and the water from the acid solution tank means, the alkali solution tank means, and the water supply means are controlled in order to bring said at least one of the ion concentrations to the prescribed acceptable range.

9. A hydroponic nutrient solution control system for continuous controlling the individual nutrient ion content of a nutrient solution to be supplied to plants to be grown, comprising:
nutrient solution tank means for containing the nutrient solution to be supplied to the plants, to which the nutrient solution supplied to the plants are returned;
pH meter means for measuring pH of the nutrient solution in the nutrient solution tank means;
an ion analyzer device for measuring an ion concentration of a plurality of nutrient ion ingredients of the nutrient solution in the nutrient solution tank means independent of other nutrient ion ingredients of the nutrient solution in the nutrient solution tank means;
a plurality of acid solution tank means for containing acid nutrient ion ingredient solutions, each acid solution tank means separately containing an acid nutrient ion ingredient solution comprising a compound selected from the group consisting of $HNO_3$, $H_3PO_4$, and $H_2SO_4$, to be supplied to the nutrient solution in the nutrient solution tank means, wherein each acid nutrient ion ingredient solution is capable of both lowering the effective pH of the nutrient solution and raising the concentration of a single nutrient ion contained in the nutrient solution;
a plurality of alkali solution tank means for containing alkali nutrient ion ingredient solutions, each alkali solution tank means separately containing an alkali nutrient ion ingredient solution comprising a compound selected from the group consisting of $KOH$, $Ca(OH)_2$, $Mg(OH)_2$, and $NH_4OH$, to be supplied to the nutrient solution in the nutrient solution tank means, wherein each alkali nutrient ion ingredient solution is capable of both raising the effective pH of the nutrient solution and raising the concentration of a single specific nutrient ion contained in the nutrient solution; and
means for automatically controlling supplies of the acid nutrient ion ingredient solutions and the alkali nutrient ion ingredient solutions by selectively operating appropriate ones of the acid solution tank means and alkali solution tank means, according to the pH measured by the pH meter means and the ion concentrations measured by the ion analyzer device.

\* \* \* \* \*